United States Patent
Burger

(12) 
(10) Patent No.: US 6,444,245 B1
(45) Date of Patent: Sep. 3, 2002

(54) METHOD AND APPARATUS TO FORM A TOROID FILLED BAGEL DOUGH PRODUCT

(76) Inventor: Alvin Burger, 9990 SW. 77th Ave.-Penthouse 8, Miami, FL (US) 33156

( * ) Notice: Subject to any disclaimer, the term of this patent is extended or adjusted under 35 U.S.C. 154(b) by 0 days.

(21) Appl. No.: 09/852,503

(22) Filed: May 10, 2001

(51) Int. Cl.[7] .............................. A21C 11/00; A21D 6/00
(52) U.S. Cl. ...................... 426/297; 99/442; 99/450.6; 425/364 B; 426/499; 426/500; 426/512
(58) Field of Search ................................. 426/297, 499, 426/500, 502, 512; 99/442, 450.6; 425/364 B

(56) References Cited

U.S. PATENT DOCUMENTS 3,799,726 A * 3/1974 Lugo ...................... 425/364 B
5,395,229 A * 3/1995 Atwood ...................... 426/449

* cited by examiner

Primary Examiner—George C. Yeung
(74) Attorney, Agent, or Firm—Pendorf & Cutliff

(57) ABSTRACT

A method and apparatus of making a toroid filled bagel dough product and the product formed thereby. The product can be produce by a method comprising adding the ingredients into a dough mixer; transferring the dough to a hopper above a sheeting extruder for pre-shaping the dough into a generally uniform and precise width; advancing the dough into cutting wheels suspended above the dough to cut the dough to continuous ribbons of desire width; conveying each continuous ribbons to a depositor to deposit a strand of filling material onto the ribbon; conveying the continuous ribbon with the filling material into a second conveyor having narrow belts; each narrow belt is drawn into a forming tube for forming continuous cylinders; conveying each continuous cylinder to a second cutting device to cut each continuous cylinder into logs of a desire length and crimp the end of each log to produce a seal of the dough around the filling material; transferring each log to a corrugated conveyor belt having intermeshing side edges; passing the corrugated conveyor belt into a forming tube in which the side edges of the corrugated conveyor belt curl up and come in locking contact between them so that each log is formed into a toroid shape.

14 Claims, 3 Drawing Sheets

METHOD AND APPARATUS TO FORM A TOROID FILLED BAGEL DOUGH PRODUCT

BACKGROUND OF THE INVENTION

1. Field of the Invention

The present invention concerns a unique product having the outward appearance of a conventional bagel, but having an axial ring of a filling material provided within the bagel dough shell. The invention further concerns a method and apparatus for converting an unformed quantity of a fairly heavy, tacky dough, i.e. bagel dough, into a plurality of uniformly sized and shaped filled bagel dough products having toroidal configuration. More particularly, the invention concerns to a method and apparatus by which conventional bagel making apparatus as found in most bagel shops can be adapted to making toroidal filled bagel dough products.

2. Discussion of the Related Art

Bagels are formed from a very heavy, tough and elastic dough. In forming the dough before baking it, the dough cannot be over-worked, punished, or kneaded excessively, or it will not rise during the baking operation. The finished bagel should be seamless and should be uniform in thickness.

Various types of apparatuses for automatically forming dough into toroids for subsequent proofing and baking have been developed heretofore and are in use commercially. In one type of such apparatus, a continuous belt is drawn through a stationary tube having a dough forming mandrel positioned centrally thereof to form dough strips into a toroidal configuration. In these prior art apparatuses, the dough piece is placed into the forming zone between the mandrel and the conveyor, which is moving relative to the mandrel and is rolled, kneaded, and worked until it has extended circumferentially around the mandrel. An advantage of the belt type bagel-making apparatus is that the belt, associated mandrel and sleeve through which the belt passes can be switched on any particular apparatus to provide for the making of different size bagels. Such apparatuses are also generally less expensive to construct than the rigid cup type apparatuses discussed hereinafter.

A disadvantage of the use of a continuous belt/mandrel conveyor has necessitated the use of a generally complex conveyor apparatus and further, has resulted in excessive kneading and over-working of portions of the dough.

Another disadvantage of the belt apparatuses is that belts tend to wear out in anywhere from three to six months' time. In addition, the length of this type of apparatus is fairly long in order to allow for the closing and opening of the belt as it approaches and leaves the forming sleeve within which the toroid bagel dough products are formed.

Other types of prior bagel-making apparatuses have used metal forming cups which are manipulated by the apparatus as opposed to the use of a belt for forming bagels as mentioned above. One approach is shown in the Ritter U.S. Pat. No. 3,379,142 where a plurality of half cups are provided on two opposed conveyors arranged so that the cups come together around a stationary mandrel to form dough therebetween. Another approach has been to use a single conveyor having metal cups of cylindrical configuration which are themselves articulated by virtue of being in three relatively hinged rigid pieces which are guided during the forming operation by associated tracks as the cups pass a stationary mandrel. Apparatuses for making bagels or other dough products in toroid configuration, employing metal cups, have the advantage of long life. However the metal forming cups from a practical standpoint must be coated with a plastic material so as to prevent the dough from adhering thereto. Sometimes the plastic coating on the cups tends to wear, and the cups must be removed for sandblasting and then recoating before being replaced. Also, while these metal cup forming-member apparatuses can be made in relatively short length for convenience of their location in a commercial bakery environment, they are limited to making a single size of dough product determined by the size of the forming cups.

U.S. Pat. No. 4,368,019 (Thompson) issued Jan. 11, 1983, discloses a dough receiving, shaping, and forming apparatus for making dough bodies of predetermined size and configuration. The apparatus generally comprises, in a single apparatus frame, an infeed conveyor for receiving a batch of unshaped dough, at least two pairs of shaping rollers, and a divider means to pre-shape the dough into two rectangular strips and a forming means. The forming means receive the individual dough strips and forms them into toroids or alternatively into dough balls of various sizes. The forming means comprise a large number of individual tubular cups mounted on a drive chain, each cup individually having an open position and a closed position. In use, a dough strip is placed into an open cup; the cup is then advanced toward a stationary mandrel. The cup is closed so that it forms a cylinder around the mandrel. As the closed cup advances along the length of the mandrel, the dough becomes rolled into a toroid shape. Once the toroid is formed, the cup is opened, and the formed toroid is removed for further processing. Unfortunately, this type of dough divider and forming apparatus is prone to mechanical breakdown due to the complexity of its design.

In the prior art, the dough is worked continuously by the dough-forming apparatus and, by virtue of the fact that these prior art apparatuses utilize a single piece of dough which is manipulated until it has elongated sufficiently to extend completely around the forming mandrel, tend to further overwork, punish, and excessively knead the bagel dough which again increases the risk that it will not rise properly during baking.

The above described prior art relates to homogeneous bagel dough products. The present inventor discovered various processes by which bagel dough and fillings of various sizes could be combined into a composite cheese filled bagel dough product, and these differently dimensioned bagel products could be processed and baked to preserve the filling. However, although the various products had desirable properties, each required a complex specialized apparatus and close monitoring, adjustment, and control in order to produce filled toroidal bagel products having a conventional appearance.

The addition of a filling material arranged in or between a dough piece constitutes an additional problem to the process of forming the toroid shape. When a filled dough product is deposited in a toroid forming apparatus having a mandrel, a rupture of the dough always occurs and the filling material is drawn out of the dough producing a big mess.

Accordingly, the present inventor felt a need for a simplified, economical, reliable, and easy-to-use process and apparatus for forming filled bagel dough products that are seamless and uniform in thickness. More particularly, to a method and apparatus capable of producing large quantities of uniformly sized and shaped filled bagel dough products in a relatively short period of time without changing the inherent desirable qualities of the dough by overworking and punishing it.

SUMMARY OF THE INVENTION

It is an object of the present invention to provide a filled bagel dough product which has the outward appearance of a conventional bagel, which has the chewy bagel dough texture of a New York style bagel, and which is filled in the core with an even ring of filler material such as meat, seafood, poultry, ham, bacon, cream cheese, sausage, hard cheese, egg, or a combination thereof.

It is yet a further object of the present invention to provide a method and apparatus for converting an unformed quantity of bagel dough into a plurality of uniformly sized and shaped filled bagel dough products having a generally toroidal configuration.

It is yet a further object of the present invention to provide an apparatus which is gentle to the dough, easily manufactured and operated, which has a relatively short length for ease of utilization in commercial environments, which is easily dismantled for cleaning or repair, which is provided so that it may be easily modified to make dough products of varying size, and has a long working life.

It is yet a further object of the present invention to provide a method for producing a filled bagel dough product, which can be consumed with great convenience, for example, while driving a car, while walking, while walking in a shopping mall, while viewing a sports activity, or while engaged in other activities.

In view of the foregoing disadvantages inherent in the known processes of forming a filled bagel in a traditional toroid shape, the present inventor discovered a unique method and apparatus to form a traditional toroid bagel shape that can be adapted to any existing bagel-making apparatus in a simple and inexpensive way.

Despite the apparent technical contradictions of forming a filled bagel dough product in toroidal shape, the present inventor discovered a method and apparatus that will produce a toroidal filled bagel dough product that is seamless and uniform in thickness.

Generally stated, the present invention includes a filled bagel dough product in toroidal shape that can be produced by a method comprising:

forming the bagel dough;

extruding the dough from a sheeting extruder to form a continuous dough;

cutting the sheet into a least one continuous ribbon having sides edges;

depositing a strand of filling material onto each continuous ribbon of dough;

conveying each continuous ribbon with the filling material onto a narrow conveyor belt having side edges;

drawing the narrow belt into a forming tube for forming a continuous cylinder, wherein drawing the narrow belt through the forming tube causes the narrow belt to curl upwards until the side edges touch and the narrow belt takes the shape of the forming tube and simultaneously causing the side edges of each continuous ribbon to contact and fuse and form the continuous cylinder;

cutting each continuous cylinder into logs, each log having a first end and a second end;

depositing each log transversely across a corrugated conveyor belt having intermeshing side edges; and drawing the corrugated conveyor belt into a forming tube in which the sides of the corrugated conveyor belt curl up and intermesh so that the log is formed into a toroid shape.

The present application also comprises the apparatus for forming a toroidal dough product, said apparatus comprising in recombination:

a corrugated conveyor belt adapted for transversely transporting the dough product, the conveyor belt comprising side edges, each dough product comprising a first end and a second end;

a toroid forming tube, the forming tube surrounding at least one segment of the corrugated conveyor belt;

wherein drawing the corrugated conveyor belt through the forming tube causes the belt to curl up until the side edges intermesh and simultaneously causing the ends of the dough to come up, contact and fuse forming a toroid shape.

A more complete understanding of the present invention will be afforded to those skilled in the art from a consideration of the following detailed description of the present invention.

The foregoing has outlined rather broadly the more pertinent and important features of the present invention in order that the detailed description of the invention that follows may be better understood and so that the present contribution to the art can be more fully appreciated. Additional features of the invention will be described hereinafter, which form the subject of the claims of the invention. It should be appreciated by those skilled in the art that the conception and the specific embodiments disclosed may be readily utilized as a basis for modifying or designing other toroidal filled bagel dough products for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

The present invention will be explained in greater details with reference to the drawings.

DETAILED DESCRIPTION OF THE INVENTION

Preparing Bagel Dough

Figure 1:
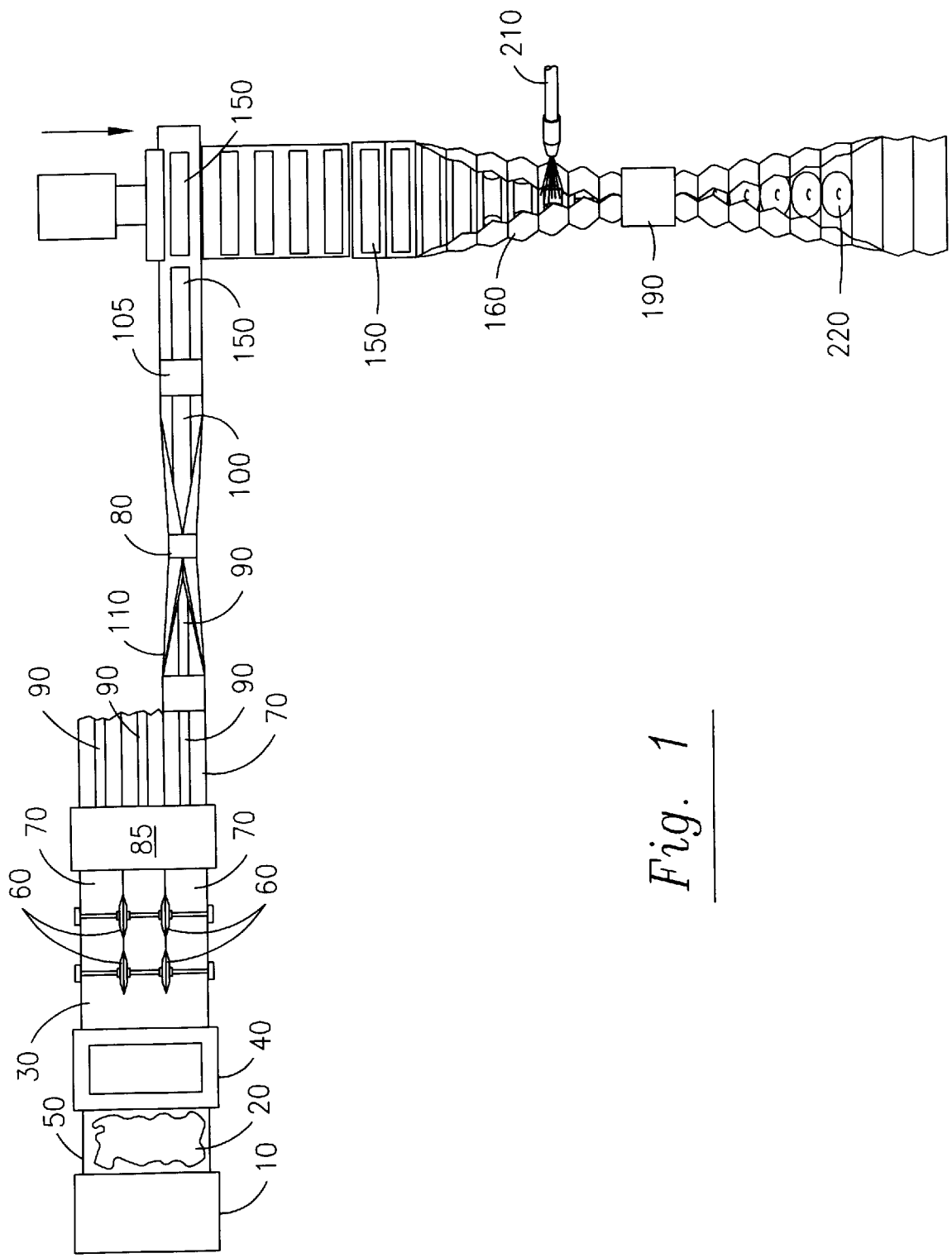
FIG. 1 is a top view of the filled bagel dough making process modified according to the present invention.

Although the present invention is not limited to bagel dough, bagel dough is preferred, and the invention will be illustrated with examples using bagel dough. The term "bagel dough," as used herein, refers to a very turgid, high protein dough, such as known to make bagels using conventional bagel-making techniques. Such dough is similar to a lean French bread dough, being firm to the touch and easily rolled upon a floured surface. The dough is comprised of a mixture of flour, water, yeast, salt, and, sometimes, sugar. The flour should be a high gluten flour, such as a good clear spring wheat flour with protein content of typically 13.5–14% of flour weight. Water should be added in a quantity of typically 50–53% of flour weight. Salt content should typically be 1.5–2.2% of flour weight. Yeast should be added in a quantity of typically 0.5–2% of flour weight. Sugar, which serves as a food. for the yeast and not as a contributor to the final product, should be a dextrose, corn syrup, high fructose or other fermentable sugar, and can be added up to 4% of flour weight. Residual sugar contributes to the browning of the crust during baking.

Although it is possible to obtain and mix all the separate individual ingredients necessary for making a bagel dough, it has been found more convenient to form the bagel dough using a powdered base such as that produced by J+K ingredients Co. In a specific example, 16 lbs. of base are mixed with 5 lbs. of water at 50–55° F. If the water is too hot, the yeast may subsequently be too active and overdevelop, thus the initial water temperature should not exceed 55° F. To this base and water are added 14 oz. of yeast, 100 lbs. of high gluten flour. The preferred flour is high in ash and protein and gives the bagel product the distinctive chewy texture.

Dough Mixer

A commonly available commercial dough mixer 10 is located at the beginning of the production line. The dough mixer 10 can be of any type. The ingredients are mixed for 8–13 minutes during which time the dough rises in temperature to 75–78° F. The dough is then allowed to proof or develop for period until it becomes stretchable and workable.

The dough 20 can be transferred from the mixer to the hopper by either lifting up the mixer and tipping over directly onto the hopper; or lifting up the mixer and tipping over a conveyor belt that will gradually feed the hopper.

Hopper/Dough Extruder

The dough is set into a hopper 40 of a dough extruder, which supplies the dough 20 periodically to the sheeter 30. The extruder forms a big block of dough having the same width as the width of the conveyor belt on the sheeter.

It will be understood that while one hopper is shown, the system can be adapted for use with any number of hoppers. Therefore, the invention is not limited by the number of hoppers.

Conveyor Belt

The dough 20 is continuously advanced through a sequence of treatment stations by the conveyor belt 50. The conveyor belt 50 is a conventional flexible non-sticky continuous conveyor belt, which is driven at a constant speed by conventional means, not shown.

Sheeter

It is very important to have a lapping machine, which gently handles the dough and maintains a substantially constant or slightly increasing dough speed.

The present invention utilizes a conventional dough sheeter 30 having rollers and a back and forth movement, like the "Doge" dough machine, to flatten the dough and form a continuous sheet from ⅛ to ¼ inch thick and either 6–8 inches wide or 1¾–3 ½ inches wide. The dough sheet is sufficiently pliable to enable subsequently severed portions to be rolled into elongated tubular or generally cylindrical configurations.

Cutter

Figure 2:
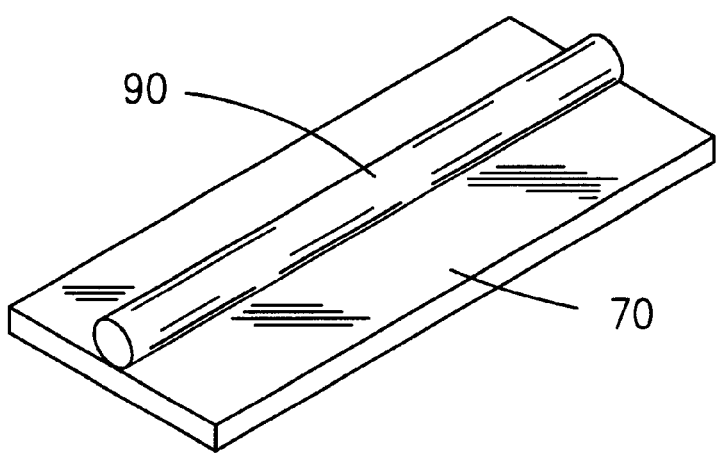
FIG. 2 shows the flattened sheet of bagel dough with a strand of filling deposited along the longitudinal centerline.

The conveyor belt moves the sheet to cutting wheels 60 placed suspended above the dough sheet and pre-positioned to cut the dough to the desire width and form continuous ribbons 70 as shown by FIG. 2. The wheels are positioned sufficiently close to the conveyor belt to cooperate therewith and cut completely through the thickness of the dough sheet, thus dividing it into continuous ribbons 70.

The cutting wheels are made of stainless steel and move by the movement of the conveyor belt.

Filler

The continuous ribbons 70 are continuously advanced by the conveyor belt to a conventional filling depositor 85 where stands of approximately 1–2 oz. of filling material 90 may be continuously or intermittently (electronic timing) deposited on the center of the continuous ribbons 70.

The term filling is intended to refer to any product such as meat, seafood, poultry, ham, bacon, cream cheese, sausage, hard cheese, egg, or a combination thereof, which can be incorporated in a bagel dough and which gives off sufficient steam in the steaming or baking step of the processes discussed below for forming a skin on the interior surface of the filled bagel dough product.

Rolling

Figure 3:
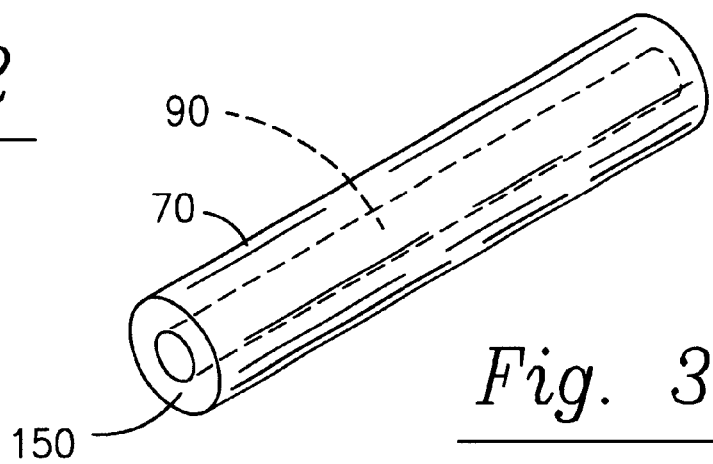
FIG. 3 shows a rolled, filled bagel dough cylinder.
Figure 4:
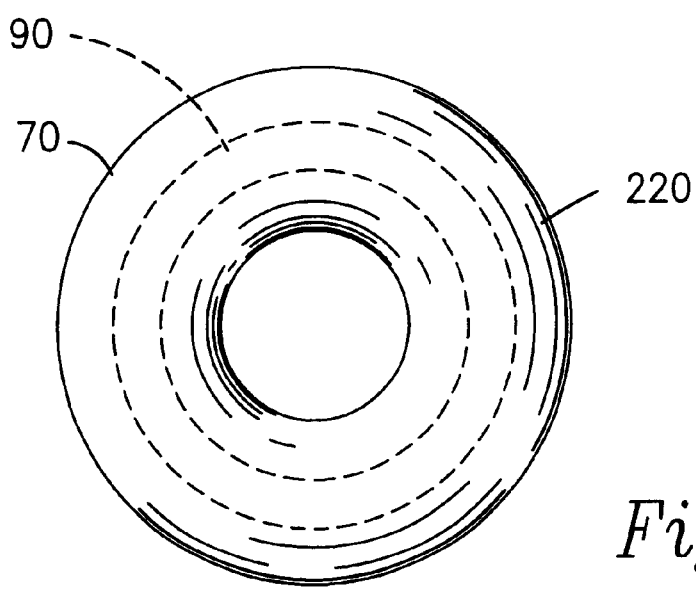
FIG. 4 is a top cross-sectional view of a filled, rolled bagel dough product according to the present invention.
Figures 5, 6:
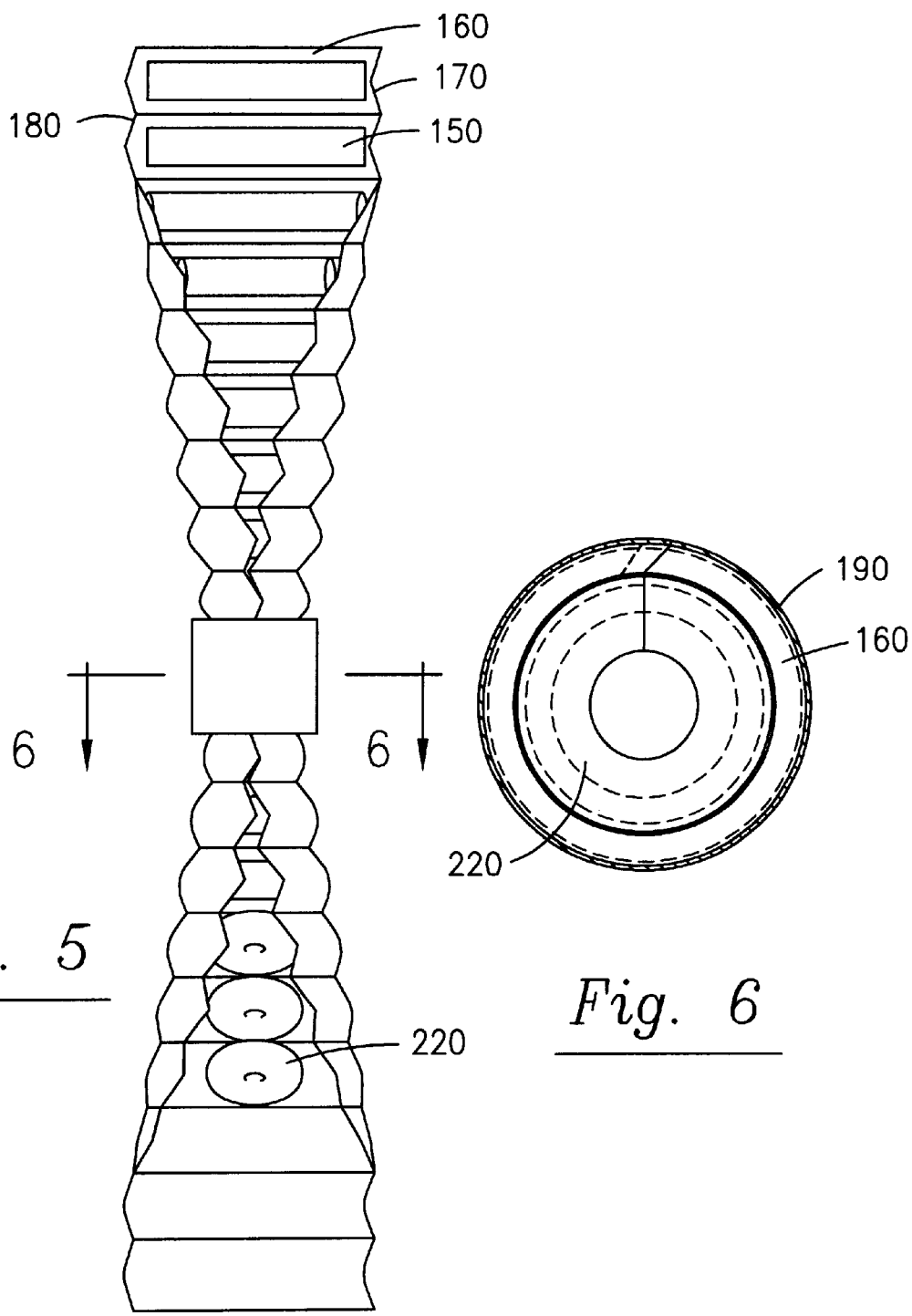
FIG. 5 is a top view of the toroid-forming apparatus according with the invention.
FIG. 6 shows a cross sectional view of line A—A on FIG. 5.

The continuous ribbons with the filling material are transferred to a log-forming table having a second conveyor 110, having narrow belts. These second belts are drawn longitudinally through the center axis of forming tubes 80, which have an inner circumference approximately equal to the width of the belts. Drawing the belts through the forming tubes cause the belt to curl upwards until the side edges touch, causing the second conveyor belt to take the shape of the forming tube and simultaneously causing the edges of the continuous ribbons 70 to contact and fuse and form a continuous cylinder 100 of about 18 to 24 inches long around the filling material 90, as shown in FIG. 3.

The inventor surprisingly discovered that forming the cylinder using the forming tube according to the present invention, the final product does not present layers that will show up in the final product.

Second Cutting Device

The continuous cylinders 100 of bagel dough with filling material hermetically sealed in the center axis leave the forming tubes and go to second cutting devices 105 to cut the continuous cylinders into logs 150 of a desired length.

The cutters cut and crimp the edges of the dough to seal the filling material within the cut dough. This will produce a seal of the dough around the filling, which has been encased in the ribbon of dough.

Forming the Toroid

The logs 150 are then deposited to a cross conveyor to move the log to a corrugated conveyor belt 160, which runs in the opposite direction of the second conveyor belt. The corrugated conveyor has a special configuration including rise areas 8–15 inches width, preferable 10–13 inches width; indentation 0.5–1 inch width and ¼ inch deep; a total belt thickness between 0.25–1.5 inches. The cross conveyor also include a right size protrusion 170 and a left side female indentation 180 in any shape that intermesh together.

Usually there is more than one corrugated belt and forming tube, so by changing the corrugated belt and toroid forming tube a desire size filled bagel dough product can be produced.

The corrugated conveyor is drawn longitudinally through the center axis of a toroid forming tube 190, which has an inner circumference approximately equal to the width of the belt 160. The toroid forming tube has between 1 to 5 feet long, preferably 2–3 feet long. Drawing the belt 160 through the toroid forming tube causes the belt 160 to curl up until the side edges (the male protrusion 170 and the female indentation 180 intermesh and simultaneously cause the ends of the log 150 to come up, contact and fuse so that the log is formed into a ring or toroidal shape 220.

The inventor surprisingly found that the filled bagel product obtained by using the combination of the corrugated conveyor belt and toroid-forming tube of the present invention produces a product that is seamless and uniform in thickness.

Nozzles 210 can be provided at one side of the entrance of the toroid forming tube to spray an extremely light mist of water onto one end of the log to facilitate the connection of both ends of the log when forming the toroid.

A wet brush or wet cloth can also be provided to lightly moisten one end of the log.

Toppings

As the toroid filled bagel dough product comes out of the toroid forming tube, the toroid filled bagel product is deposited on a fourth conveyor belt or table, depending on the production scale.

The fourth conveyor belt can be made of screen mesh and includes a recycling tray under the conveyor to facilitate the recycling of the topping materials.

The toroid filled bagel dough product is then lightly wetted by a water sprayer and toppings are added to the product.

Dehydrated products, seeds, or grains are sprinkled to the top of the bagel dough product. Topping prior to proofing results in the topping being more firmly adhered to the bagel product, which facilitates handling, transporting, packaging, and consumption.

Proofing

The filled bagel product is then placed to proof within a warm cabinet (proofer) or unheated oven for 20–90 minutes, preferably 45–60 minutes at approximately 80°–120° F., preferably 90°–110° F., which permits the yeast to raise the dough.

Chilling or Freezing

Subsequent to proofing, the product should be chilled or frozen before steaming. Chilling or freezing provides the filling material with a cool internal temperature, which protects the filling material during steaming.

The product is chilled or frozen until the filling material is about 0 to 32° F., preferably 0° F. This step prevents moisture migration between dough and filling during the steaming process, thus, preserving texture and taste.

Steaming

The filled, shaped, proofed, and chilled or frozen bagel dough product may be steamed to fully cook the dough, approximately 1½–12 minutes, preferable 5–12 minutes, more preferably 8–12 minutes. The steaming time will depend on the thickness of the dough around the filling material.

During steaming, the filling material has a higher ability to withstand heat, a slower rate of heat absorption, and is partially blanketed by dough, and thus remains cooler than the dough. During steaming, dough may rise to a temperature of 200–300° F., while the filling material in the dough only rises to a temperature of 140–180° F.

The product of the invention can be placed in a steamer for a time sufficient to enable the hot steam to form a skin, not only on the outer surface of the dough, but also on the internal skin of the dough, contacting the filling material, fully cook the entire dough between the outer surface and the internal skin of the dough, setting the yeast, and forming a wet crust.

The moisture is removed from the surface of the product by using a fan.

Glazing

The filled bagel product may be optionally glazed with commercial shine product prior to the baking step to completely coat the exterior of the finished product.

The present process produces a filled bagel dough product, which is different from other frozen bagel dough products. Due to the combination of the chilling step, followed by the long steaming time, the bagel is completed cooked after steaming and can be packaged unbaked.

Chilling or Freezing—Optional

Chilling or freezing the product after the outside had been set by steaming is necessary to cool the filling material enough to prevent moisture migration between dough and filling.

The filled bagel product is chilled or frozen until the filling material is about 0°–40° F.

Browning—Optional

The steamed and then chilled or frozen product may next be placed in a conveyor oven or impinger oven between 500–550° F., for approximately 1–10 minutes, preferably about 1½ to 3 minutes, to brown the exterior crust. The time the product is placed in the oven depends upon the temperature and type of oven, and size of filled product.

Because the product is already completely cooked, the browning time can be significantly reduced.

The yeast is most likely fully deactivated prior to the browning step, but any remaining active yeast may continue to ferment within the crumb for a short period to reduce the size of gas cells in the annular interior of the baked product. The finished dough texture becomes compacted, since the crusts have already been set during the steaming step.

Freezing

The product may be frozen at any time after proofing and steaming and the product may be stored in a freezer for up to one year without deterioration.

Packaging

Any conventional packaging process may be used.

Reconstitution

The resulting product is a pre-brown ready-to-eat filled bagel dough product, which can be defrosted (2–4 hours) or re-heated in a microwave oven to provide enjoyment of the distinctive bagel taste. The process of the invention enables the steamed product to be frozen, including the filling material, for extended periods with no deterioration in quality.

The proofed, steamed, and browned ready-to-eat product is sold to consumers in a frozen state, and may be thawed and/or microwave by the consumer prior to consumption. The heat in the microwave oven penetrates in the center of the filling material and does not damage the dough, thus the filled bagel dough product of the invention displays unique characteristics that are not predictable from other reheated frozen bagel dough products. Thus, confirming that the method of making microwaveable filled bagels according to the present invention is not comparable to other frozen bagel dough processes. The process provides a novel filled bagel product that provides both bagel and special flavor in a conveniently packaged, prepared combination.

Further the product may even be reheated in a toaster oven or in a wide slot pop-up toaster to develop a crispy crust.

Although this invention has been described in its preferred form with a certain of particularity with respect to filled bagel dough product, it is understood that the present disclosure of the preferred form has been made only by way of example, and that numerous changes in the details of structures and the composition of the combination may be resorted to without departing from the spirit and scope of the invention.

I claim:

1. A process for making a toroidal bagel dough product, said process comprising the steps of:

conveying at least one continuous ribbon of bagel dough along a conveyor having a narrow belt, the narrow belt having side edges, the bagel dough having side edges;

drawing the narrow belt through a forming tube to cause the narrow belt to curl upwards until the side edges touch and the narrow belt takes the shape of the forming tube and simultaneously causing the side edges of the continuous ribbon of dough to contact and fuse and form a continuous cylinder;

cutting each continuous cylinder into logs, each log having a first end and a second end;

depositing each log transversely across a corrugated conveyor belt, the corrugated conveyor belt comprising intermeshing sides edges;

drawing the corrugated conveyor belt through a toroid forming tube to cause the corrugated conveyor belt to curl up until the side edges intermesh and simultaneously causing the ends of each log to come up, contact and fuse forming a toroid shape.

2. The process according to claim 1, wherein the corrugated conveyor includes rise areas 8–5 inches width, indentation 0.5–1 inch width and ¼ inch deep.

3. The process according to claim 1, further including one log per corrugated.

4. A process for making a toroidal filled bagel dough product, said process comprising the steps of:

a) extruding a bagel dough from a sheeting extruder to form a continuous sheet;

b) cutting the sheet into at least one continuous ribbon, each ribbon having side edges;

c) depositing a strand of a filling material onto each continuous ribbon of dough;

d) conveying each ribbon with the filling material onto a narrow conveyor belt, the narrow conveyor belt having side edges;

e) drawing the narrow conveyor belt into a forming tube to form at least one continuous cylinder, wherein drawing the narrow belt through the forming tube causes the narrow belt to curl upwards until the side edges touch and simultaneously causing the side edges of each continuous ribbon to contact and fuse and form the continuous cylinder;

f) cutting each continuous cylinder into logs, each log having a first end and a second end;

g) depositing each log transversely across a corrugated conveyor belt having intermeshing side edges; and h) drawing the corrugated conveyor belt into a toroid forming tube to form a toroid shaped filled bagel dough product, wherein drawing the corrugated conveyor through the forming tube causes the corrugated belt to curl up until the side edges intermesh and simultaneously causing the ends of each log to come up, contact and fuse forming a toroid shape.

5. The process according to claim 4, wherein the forming tube has an inner circumference approximately equal to the width of the narrow belt.

6. The process according to claim 4, wherein step f) further includes crimping the ends of the log to seal the filling material within each log.

7. The process according to claim 4, wherein the corrugated conveyor comprises rise areas 8–15 inches width, indentation 0.5–1 inch width and ¼ inch deep; size edges having in one size a male protrusion and in the opposite size a female indentation.

8. The process according to claim 4, further comprising a nozzle at one side of the entrance of the toroid forming tube to spray an extremely light mist of water onto one end each log.

9. The process according to claim 4, further including the steps of:

(i) proofing the product to activate a yeast to raise said bagel dough through fermentation;

(j) chilling or freezing the product of step (i) to a core temperature between 0 to 40° F.; and (k) steaming the product of step (j) to fully cook the dough.

10. The process as in claim 9, further including:

(l) optionally chilling or freezing the product of step (k) to a core temperature of 0 to 40° F.;

(m) freezing the product of step (l); and (n) packing the product;

wherein the product of step (n) is thawed and optionally heated in a microwave oven by the consumer prior to consumption.

11. The process as in claim 4, wherein said filling material is selected from the group consisting of cheese, cream cheese, hard cheese, and combination thereof.

12. The process as in claim 4, wherein said filling material is selected from the group consisting of meat, seafood, poultry, ham, bacon, sausage, egg, and combination thereof.

13. An apparatus for forming toroidal dough products, said apparatus comprising in combination:

a corrugated conveyor belt for transversely transporting the dough products, the conveyor belt comprising side edges, each dough product comprising a first end and a second end;

a toroid forming tube, the forming tube surrounding at least one segment of the conveyor belt;

wherein drawing the corrugated conveyor belt through the forming tube causes the corrugated conveyor belt to curl up and intermesh taking the shape of the toroid forming tube and simultaneously causing the ends of each dough product to come up, contact and fuse forming a toroid shape.

14. The apparatus according to claim 13, wherein the toroid forming tube has an inner circumference approximately equal to the width of the corrugated conveyor.

* * * * *